US008548508B2

(12) United States Patent
Yi et al.

(10) Patent No.: US 8,548,508 B2
(45) Date of Patent: Oct. 1, 2013

(54) METHOD OF IDENTIFYING TELEMATICS CALLS

(75) Inventors: Ki Hak Yi, Windsor (CA); Sethu K. Madhavan, Canton, MI (US); Kenneth L. Peirce, Grosse Pointe Farms, MI (US)

(73) Assignee: General Motors LLC, Detroit, MI (US)

( * ) Notice: Subject to any disclaimer, the term of this patent is extended or adjusted under 35 U.S.C. 154(b) by 88 days.

(21) Appl. No.: 12/848,008

(22) Filed: Jul. 30, 2010

(65) Prior Publication Data

US 2012/0028656 A1 Feb. 2, 2012

(51) Int. Cl.
*H04W 68/00* (2009.01)

(52) U.S. Cl.
USPC ............................ 455/458; 455/515; 455/345

(58) Field of Classification Search
USPC .................. 455/458, 569.2, 58, 562.1, 575.9, 455/95–99, 151.1, 345; 340/901–905, 426.16
See application file for complete search history.

(56) References Cited

U.S. PATENT DOCUMENTS

| 6,064,889 | A * | 5/2000 | Fehnel | 455/511 |
|---|---|---|---|---|
| 6,405,033 | B1 * | 6/2002 | Kennedy et al. | 455/414.1 |
| 2004/0180647 | A1 * | 9/2004 | Schwinke et al. | 455/417 |
| 2004/0203573 | A1 * | 10/2004 | Chin et al. | 455/404.1 |
| 2005/0014481 | A1 * | 1/2005 | Chin et al. | 455/403 |
| 2005/0136978 | A1 * | 6/2005 | Kamdar et al. | 455/558 |
| 2005/0202799 | A1 * | 9/2005 | Rollender | 455/404.1 |
| 2005/0287979 | A1 * | 12/2005 | Rollender | 455/404.1 |
| 2007/0082669 | A1 * | 4/2007 | Colban | 455/433 |
| 2008/0102854 | A1 * | 5/2008 | Yi et al. | 455/456.1 |
| 2008/0188181 | A1 * | 8/2008 | Choi et al. | 455/41.2 |
| 2010/0304712 | A1 * | 12/2010 | Sweeney et al. | 455/410 |
| 2011/0009097 | A1 * | 1/2011 | Sweeney et al. | 455/414.1 |

FOREIGN PATENT DOCUMENTS

DE 10033808 A1 1/2002

OTHER PUBLICATIONS

References in German Office Action for Application No. 10 2011 108 672.6, dated Jan. 21, 2013, 2 pages.

* cited by examiner

*Primary Examiner* — Allahyar Kasraian
(74) *Attorney, Agent, or Firm* — Anthony Luke Simon; Reising Ethington P.C.

(57) ABSTRACT

A method of identifying telematics calls includes the steps of receiving at a vehicle telematics unit a paging message used to connect a call over a wireless carrier system; determining at the vehicle telematics unit if the paging message used to connect the call includes a Mobile Identification Number (MIN) or a Mobile Equipment Identifier (MEID); and establishing the call and, if the vehicle telematics unit determines that the paging message includes the MEID, entering into a mode in which the vehicle telematics unit uses a modem for receipt and transmission of data.

16 Claims, 2 Drawing Sheets

METHOD OF IDENTIFYING TELEMATICS CALLS

TECHNICAL FIELD

The present invention relates generally to vehicles and more particularly to communications between telematics devices, central facilities, and third-parties.

BACKGROUND OF THE INVENTION

Increasingly, vehicle manufacturers outfit their vehicles with a wide array of wireless communications capabilities. Telematics units installed in modern vehicles can wirelessly send both voice and data communications to a variety of recipients. Recipients can be central facilities, such as call centers, that include servers and/or live advisors capable of responding to the telematics unit. Vehicles equipped with telematics units have the ability to monitor and gather a diverse array of data about vehicle-related conditions and send it via the telematics unit. The telematics units can also receive voice and/or data calls from outside callers. For example, during normal operation a telematics unit can receive voice calls from third parties while also standing ready to receive voice and data calls from a call center. However, it is possible that calls originating from third parties may attempt to communicate unwanted or harmful data with the telematics unit. And in those situations, it may be helpful to distinguish between undesirable data calls from third parties and intended calls from the call center.

SUMMARY OF THE INVENTION

According to an aspect of the invention, there is provided a method of identifying telematics calls. The steps include receiving at a vehicle telematics unit a paging message used to connect a call over a wireless carrier system; determining at the vehicle telematics unit if the paging message used to connect the call includes a Mobile Identification Number (MIN) or a Mobile Equipment Identifier (MEID); and establishing the call and, if the vehicle telematics unit determines that the paging message includes the MEID, entering into a mode in which the vehicle telematics unit uses a modem for receipt and transmission of data According to another aspect of the invention, there is provided a method of identifying telematics calls. The steps include receiving a call placed to a vehicle telematics unit; determining that the call originated from a call center based on a trunk group associated with the call; and paging the vehicle telematics unit using a Mobile Equipment Identifier (MEID) associated with the vehicle telematics unit in response to the determination.

According to yet another aspect of the invention, there is provided a method of identifying telematics calls. The steps include linking the identity of a call center with the Mobile Equipment Identifier (MEID) of a vehicle telematics unit; storing the linked identity at a wireless carrier system; receiving a request to place a call at the wireless carrier system from the call center to the vehicle telematics unit; detecting the identity of the call center based on the received call; accessing the MEID of the vehicle telematics unit linked with the identity of the call center; paging the vehicle telematics unit with a paging message that includes the accessed MEID; and establishing the call and allowing the receipt of data at the vehicle telematics unit based on the receipt of the paging message that includes the accessed MEID.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method described below identifies types of telematics calls received at a vehicle telematics unit. For instance, the vehicle telematics unit can receive both voice calls and data calls. Voice calls can be carried on with call centers and third parties via the vehicle telematics unit. However, in many cases the vehicle telematics unit should only communicate data with the call center. When receiving incoming calls, the vehicle telematics unit can determine whether it should accept data from a call depending on the content of a paging messages received from a wireless carrier system. If the paging message that initiates the incoming call includes a Mobile Identification Number (MIN), the vehicle telematics unit can determine that the incoming call is not authorized for data communications. On the other hand, if the page initiating the incoming call includes a Mobile Equipment Identifier (MEID), then the use of that MEID means that the call is a data call originating from an authorized call center. The vehicle telematics unit thus enters into a data mode that enables the receipt and transmission of data. This way, the vehicle telematics unit is able to reasonably confirm the identity of a caller that provides data to the unit. This method will be described in more detail below.

Figure 1:
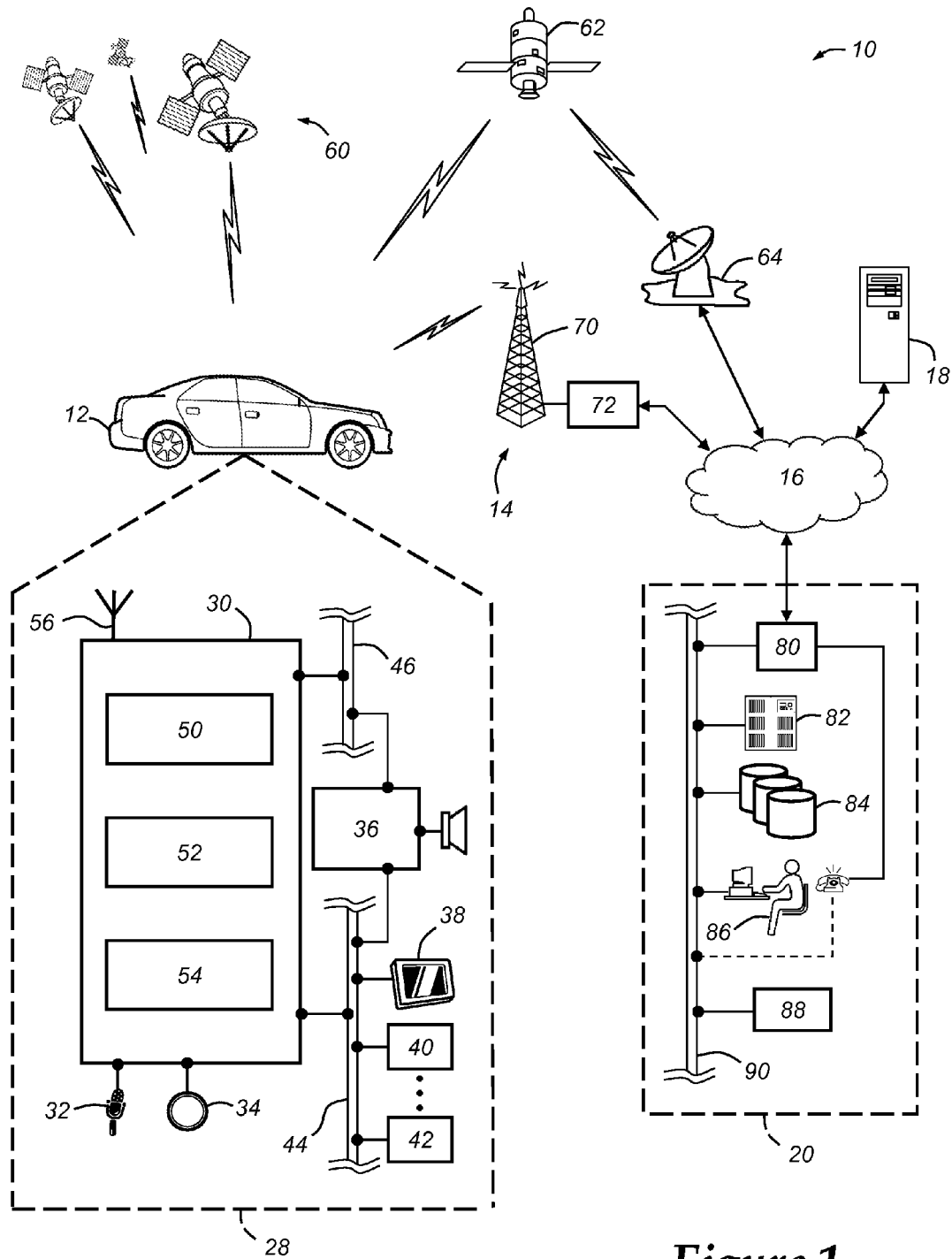
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a cellular call (a voice channel and/or a data channel) with wireless carrier system 14 so that voice and/or data transmissions can be sent and received over the call. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a vocoder, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. The call center 20 is given as one example of a central facility and it should be appreciated that other implementations are possible. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
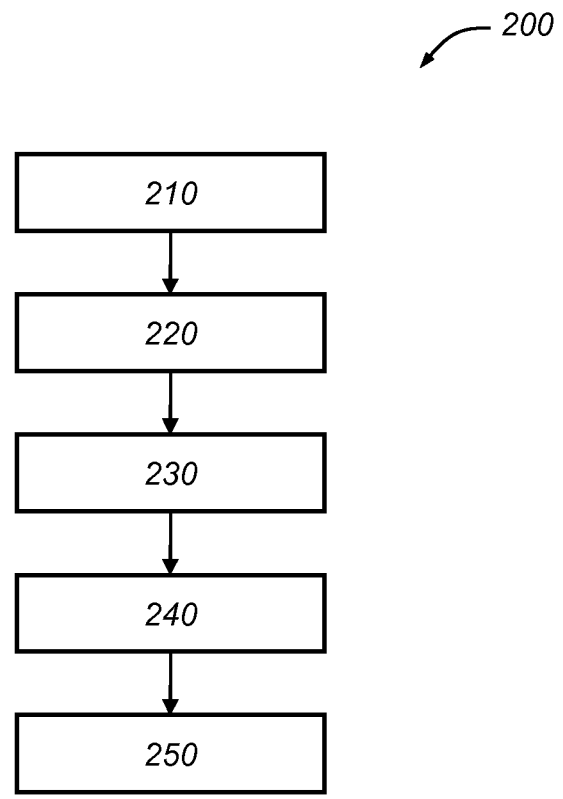
FIG. 2 is a flow chart of a method of identifying telematics calls.

Turning now to FIG. 2, there is an exemplary method 200 of identifying telematics calls. The method 200 begins at step 210 with linking the call center identity with the Mobile Equipment Identifier (MEID) of a vehicle telematics unit and storing the linked identity at a wireless carrier system. In some cases, the wireless carrier system 14 can recognize when calls are placed at the call center 20 to the vehicle telematics unit 30. For example, the call center 20 can be associated with a trunk group and calls that originate from the center 20 can be identified by that trunk group. So later, when the call center 20 calls the vehicle telematics unit 30, such as via a called party number (CPN) or mobile dialed number (MDN), the wireless carrier system 14 can understand that calls originating from that trunk group used by the call center 20 should be treated differently than other calls. This will be explained below in more detail. The identity (e.g., trunk group ID) of the call center 20 can be stored with one or more MEIDs at the wireless carrier system 14 in a variety of databases, such as a Home Location Register (HLR), as known to those skilled in the art. The method 200 proceeds to step 220.

At step 220, a request is received at the wireless carrier system to place a call from the call center to the vehicle telematics unit and the identity of the call center is detected based on the request. When the call center 20 wants to call the vehicle telematics unit 30, the call center 20 can dial the CPN or MDN associated with a particular unit 30. This request can be received at the wireless carrier system 14 and can include the telephone number from which it is dialed (a number from the call center 20 that can be part of the trunk group described above), and the CPN/MDN of the vehicle telematics unit 30 The method 200 proceeds to step 230.

At step 230, the MEID of the vehicle telematics unit that was linked/associated with the identity of the call center is accessed. This is done in response to the determination by the wireless carrier system (e.g., using the trunk group ID) that the call originated from the call center. Each vehicle telematics device 30 can be associated with a Mobile Equipment Identifier (MEID) and the MEID can be known to the call center 20 and/or the wireless carrier system 14. When the wireless carrier system 14 receives the CPN of the vehicle telematics unit 30 and the telephone number of the call center 20 from which the call is received, the system 14 can search its database(s) and obtain the MEID of the vehicle telematics unit 30. The MEID is a unique 56-bit identification number associated with a wireless device, such as a vehicle telematics unit 30. The MEID is a 14-digit hexadecimal value, which is capable of being wirelessly transmitted over the wireless carrier system 14. These identification numbers are "burned" into a device and should be resistant to modification. They can be used to facilitate mobile equipment identification. The MEIDs are coordinated with International Mobile Equipment Identifiers (IMEIs), facilitating global roaming and harmonization between 3G technologies as a universal mobile equipment identifier. While this implementation has been described with respect to MEIDs, it may also be possible to use another similar identifier, such as electronic serial number (ESN) or other address type. The method 200 proceeds to step 240.

At step 240, the vehicle telematics unit is paged using a paging message that includes the accessed MEID associated with the vehicle telematics unit. For example, the wireless carrier system 14 can use the obtained MEID of the vehicle telematics unit 30 the call center 20 wants to call and sends a paging message to that unit 30. While the paging message communicated by the wireless carrier system 14 generally serves to establish a communication handshake between the call center 20 and the vehicle telematics unit 30 through the wireless carrier system 14, the inclusion of the MEID with the paging message can add an additional signaling function. In this case, the vehicle telematics unit 30 can detect the presence of the MEID and make decisions based on its presence or absence. Normally, the vehicle telematics unit 30 is sent a paging message that includes a MIN, which is the case when third parties call the unit 30 for voice communications via a voice channel. It is worth noting that the vehicle telematics unit 30 can determine whether the MEID is present in the paging message prior to or during the call between the call center 20 and the unit 30 is set up. The method 200 proceeds to step 250.

At step 250, the receipt of data or data transmissions is permitted or blocked based on the receipt of the paging message that includes or omits the MEID. If, after receiving the paging message from the wireless carrier system 14, the vehicle telematics unit 30 determines that the paging message included the MEID, the unit 30 can enter a data mode and be ready to receive data. In that case, the presence of the MEID can authenticate to the vehicle telematics unit 30 the identity of the incoming call and/or caller that can send data. This data mode can then be switched to a voice mode if voice communication between the call center and vehicle is desired. Conversely, if the vehicle telematics unit 30 receives the page and it does not include the MEID or the paging message included a different identifier, such as a MIN, the unit 30 can enter a voice mode to be ready to receive voice communications. This can involve activating the audio system 36 in the vehicle 12 or other such action that can facilitate a voice call. Additionally, the vehicle telematics unit 30 can ignore or block attempted data communications from calls that involve receiving paging messages which do not include a MEID. That way, the vehicle telematics unit 30 can prevent unauthorized data communications from unauthorized sources. In another implementation, the vehicle telematics unit 30 can also make other determinations based on the content of the received paging message. For example, the vehicle telematics unit 30, upon receiving the paging message and determining that it does not include an MEID but rather includes a MIN, can determine whether the unit 30 includes a sufficient number of prepaid cellular minutes to accept the call and place itself in voice mode. Or in other words, if the vehicle telematics unit 30 determines it does not have any prepaid cellular minutes, the unit 30 can decide to prevent voice calling based on that determination. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, other paging or call initiating procedures that can be selected in response to a call center originated call can be used by the vehicle telematics unit to distinguish authorized from unauthorized callers for purposes of permitting or denying data communications to or from the vehicle. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of identifying telematics calls, comprising the steps of:
    (a) receiving at a vehicle telematics unit a paging message used to connect a call over a wireless carrier system;
    (b) determining at the vehicle telematics unit if the paging message used to connect the call includes a Mobile Identification Number (MIN) or a Mobile Equipment Identifier (MEID), wherein the vehicle telematics unit monitors for the presence of the MIN and the MEID; and
    (c) establishing the call and, when the vehicle telematics unit determines that the paging message includes the MEID rather than the MIN, entering into a mode in which the vehicle telematics unit uses a modem for receipt and transmission of data.

2. The method of claim 1, wherein step (c) further comprises establishing the call as a voice channel connection.

3. The method of claim 1, wherein the mode step (c) further comprises using the modem over a voice channel.

4. The method of claim 1, wherein the vehicle telematics unit permits the receipt and transmission of data based on the receipt of the MEID included in the paging message.

5. The method of claim 1, further comprising the steps of determining that the paging message includes a MIN, and placing the vehicle telematics unit in a voice mode.

6. The method of claim 5, further comprising the step of preventing modem data communications for the duration of the call.

7. The method of claim 1, further comprising the step of determining that the paging message includes a MIN; determining an amount of prepaid cellular minutes associated with the vehicle telematics unit; and allowing or denying voice calling based on the amount of prepaid cellular minutes.

8. The method of claim 1, wherein the call is placed by a call center and the MEID in the paging message is associated with the call center and stored at the wireless carrier system.

9. A method of identifying telematics calls, comprising the steps of:
    (a) linking an identity of a call center with a Mobile Equipment Identifier (MEID) associated with a vehicle telematics unit as part of a trunk group;
    (b) storing the linked identity of the call center with the MEID associated with the vehicle telematics unit as part of the trunk group at a wireless carrier system;
    (c) receiving a call placed to the vehicle telematics unit;
    (d) determining at the wireless carrier system that the call originated from the call center based on the trunk group; and
    (e) paging the vehicle telematics unit using the MEID associated with the vehicle telematics unit in response to the determination.

10. The method of claim 9, wherein the call is established as a voice channel connection.

11. The method of claim 9, further comprising the step of communicating data between the call center and the vehicle telematics unit after the vehicle telematics unit receives a paging message that includes the MEID.

12. The method of claim 11, further comprising communicating the data over a voice channel.

13. The method of claim 9, wherein the MEID is associated with the call center and stored at the wireless carrier system.

14. A method of identifying telematics calls, comprising the steps of:
    (a) linking an identity of a call center with a Mobile Equipment Identifier (MEID) of a vehicle telematics unit;
    (b) storing the linked identity at a wireless carrier system;
    (c) receiving a request to place a call at the wireless carrier system from the call center to the vehicle telematics unit;
    (d) detecting the identity of the call center based on the received call;
    (e) accessing the MEID of the vehicle telematics unit linked with the identity of the call center;
    (f) paging the vehicle telematics unit with a page that includes the accessed MEID; and
    (g) establishing the call and allowing the receipt of data at the vehicle telematics unit based on the receipt of the page that includes the accessed MEID.

15. The method of claim 14, wherein the call is established as a voice channel connection.

16. The method of claim 14, wherein allowing the receipt of data further comprises using a modem over a voice channel.

* * * * *